Oct. 13, 1953  N. E. WALKER  2,655,086
AUTOMATIC CAMERA LIGHT APERTURE CONTROL
Filed April 13, 1951  2 Sheets-Sheet 2
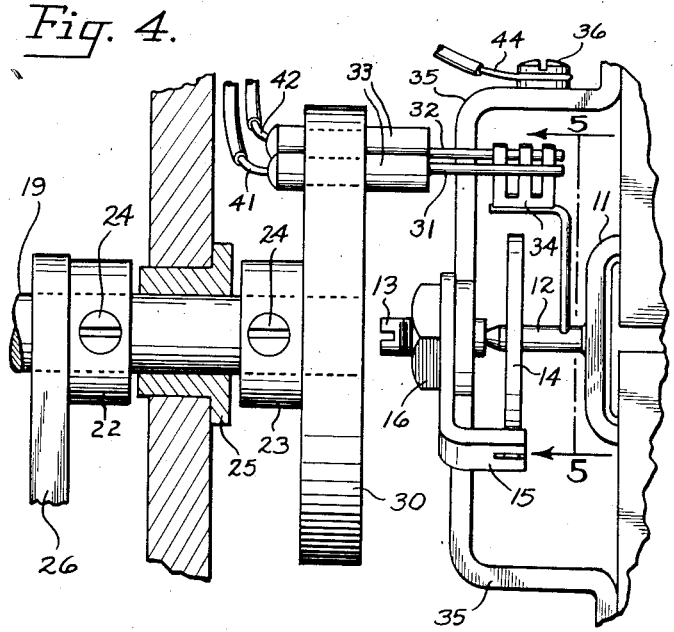
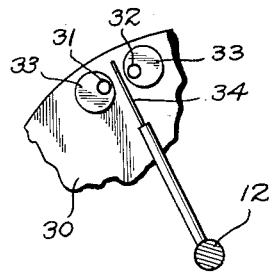
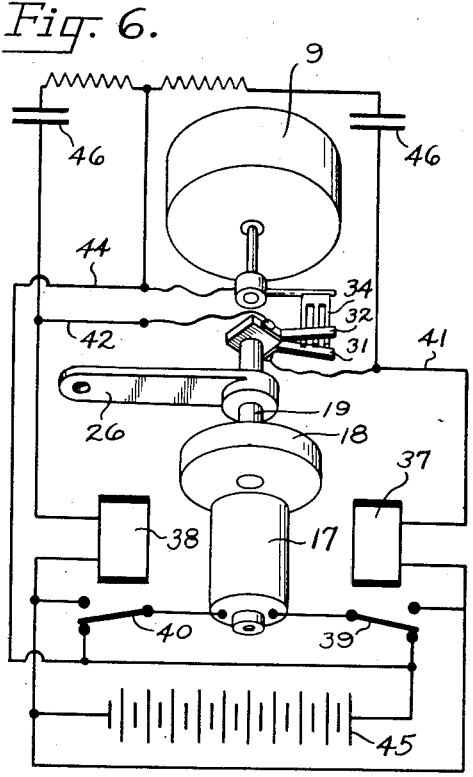
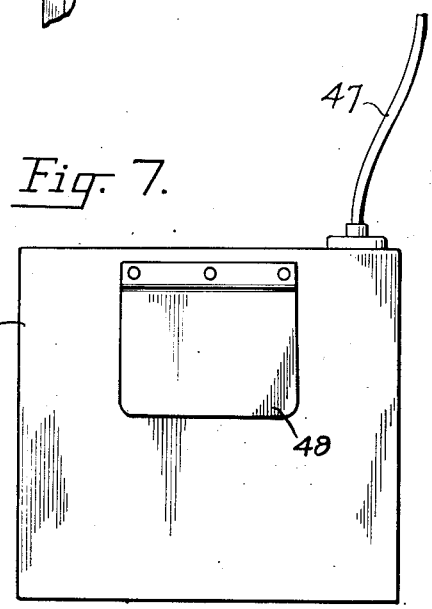
INVENTOR.
Neville E. Walker

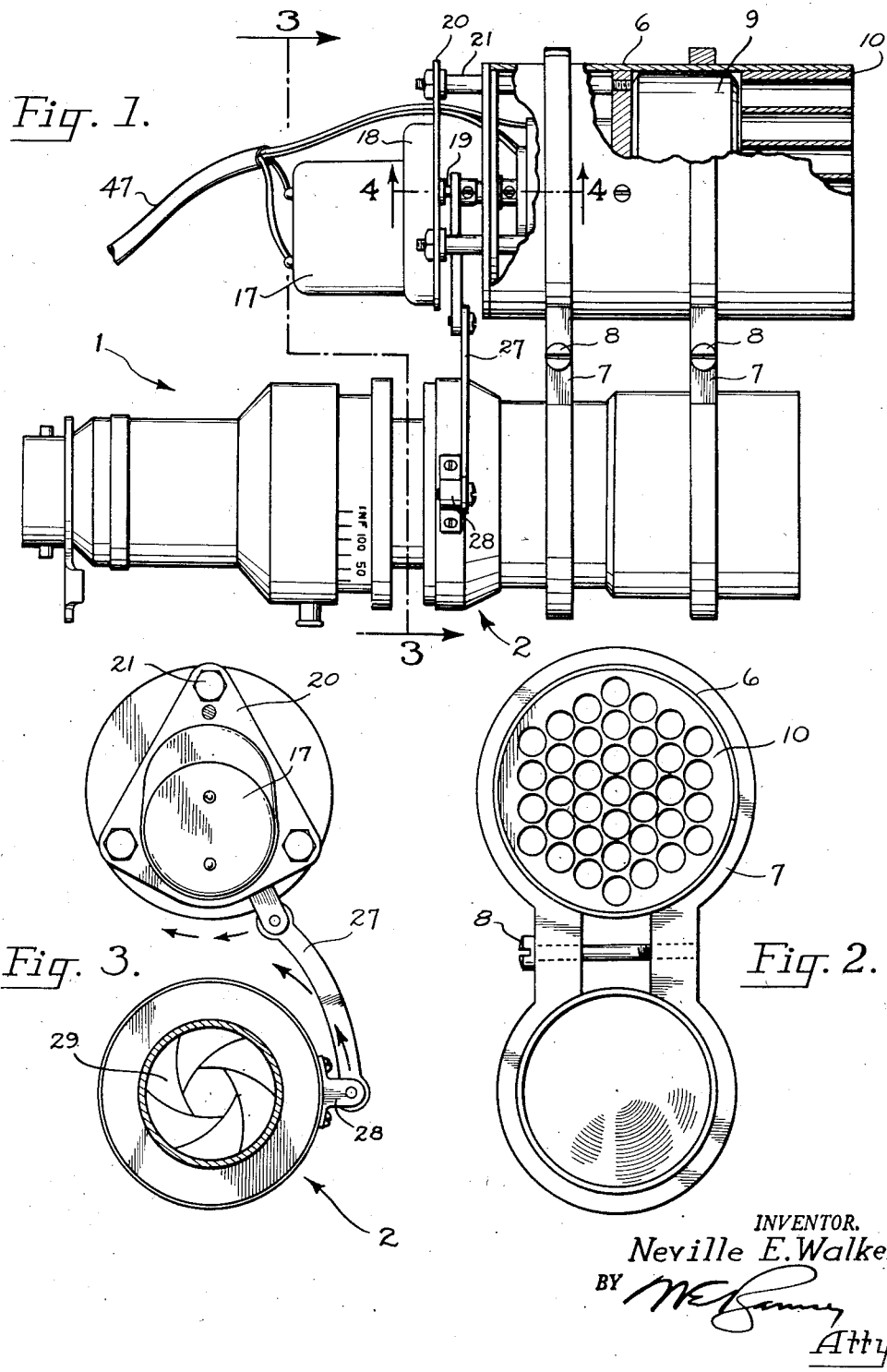

Patented Oct. 13, 1953

2,655,086

UNITED STATES PATENT OFFICE 2,655,086

AUTOMATIC CAMERA LIGHT APERTURE CONTROL

Neville E. Walker, Portland, Oreg.

Application April 13, 1951, Serial No. 222,960

2 Claims. (Cl. 95—64)

This invention relates to an automatic exposure control mechanism for a camera and, in particular, to a device for adjusting the stop, aperture, iris diaphrgam or exposure control opening in a camera, continuously, in response to and in correct proportion to the brightness of the scene which is being photographed.

A particular object of my invention is to simplify and improve upon those automatic exposure control mechanisms hitherto known by correlating mechanically, a conventional light meter or other photoelectric cell input or lead element and an electric motor output or follow-up element. Such correlation, within my inventive scope, converts the weak photoelectric cell output signal to a strong electric motor output movement whereby the exposure control of a camera accurately, continuously, and proportionately will be adjusted in accord with the illumination of the scene being photographed.

Automatic exposure controls, of the type which include and are responsive to a barrier-layer photoelectric cell, are well-known in the camera art. According to the manner in which these controls utilize the current output of the photoelectric cell, they may be classified under two main headings. Thus, the conventional barrier-layer or self-generating type photoelectric cell includes a copper oxide or selenium cell which generates a potential difference when irradiated. This potential difference is directly related to the intensity of illumination or irradiation and is evidenced and utilized, in general, through the weak electric current thereby caused to flow in a wire or coil.

In the first camera control classification, the electric current from the cell is used to energize a pivotally mounted coil interposed between the poles of a permanent magnet. The coil, in turn, may carry a pointer, adapted to move over a calibrated scale as is conventional in light meters, or it may carry an arm adapted to move between two mechanical trap elements or jaws actuated by the shutter release of the camera. Examples of such trap elements are to be found in the U. S. patent to Martin 2,186,611, and the U. S. patent to Schmidt 2,187,953, wherein the coil arm is trapped and held to dictate an exposure adjustment increment as the camera shutter is released. These devices adjust the exposure control of the camera after first locking the input element at a value in accord with the level of illumination existing a short interval before the picture is taken. Accordingly, such devices are inaccurate if the illumination changes during that interval.

In the second camera control classification, the electric current from the cell first is amplified. This amplified current then is used to rotate a coil to which the camera exposure control is geared or otherwise connected. For example, in the U. S. patent to Rath 2,412,424, the direct current cell output, sequentially, is converted to an alternating current with an electromagnetic vibrator, is amplified with an audio frequency amplifier, is rectified to a direct current, and is used, in this amplified, rectified condition, to operate a camera exposure control. The complexity of this type control is obvious.

In considering the camera control art with a view to the above classification, it is apparent that all prior patentees have provided and all controls must provide some mechanical or electrical amplifying means capable of utilizing the weak output current of the photoelectric cell to provide a strong follow-up movement. This is for the reason that the current per se is too small and too weak to move or adjust even the most finely balanced exposure control with any speed or with any degree of accuracy. Accordingly devices of the first classification utilize either a manual push or the force of the shutter release spring to adjust the exposure control. This, in effect, is a mechanical amplifier. Devices of the second classification, on the other hand, modify and amplify the cell current itself until that modified current is of sufficient magnitude to actuate the control. This latter method is one of electrical or electronic amplification.

My inventive experimentation has been bounded by the above considerations. Accordingly, I have directed my primary attention to an improved amplification structure. In addition, however, my attention has been directed toward the elimination of certain disadvantages which I have found to reside, inherently, in the prior art above classified. Thus, devices of the first class have proven adequate to adjust the exposure control either of a still camera or of a motion picture camera so long as the illumination remains constant throughout one shot or photographic sequence. However, should the light level vary after the exposure control is locked, no adjustment can be or is made. This light level variance is most evident when a panoramic view is photographed either by pivoting a still camera or by shifting a motion picture camera. Thus, with a still camera, the view may include separate sectors of high and low level illumination. Similarly, with a motion picture shot of an airplane, racing auto, horseback rider or other fast-moving object, the background may alternate between a bright sky, beach, or open landscape and a dark cloud, waterfront, or shade tree. In failing to adjust the exposure control continuously during such photographic sequences or movements, the first class of prior art devices evidence a disadvantage which it is a particular object of my invention to eliminate.

Passing to the second class, I have found that these controls are unduly complex and involved. Thus, the main disadvantages of a device which must employ an electromagnetic vibrator, an audio frequency amplifier and a rectifier are ones of high initial and maintenance cost, lack of portability and ease of breakdown coupled with difficulty of repair. Accordingly, a further object of my invention is to provide a rugged, simplified camera control requiring the use of a minimum number of parts and capable of operating from small, pocket size batteries, all to the end of increasing portability, decreasing the initial cost, and simplifying repair procedures.

In service of the above inventive objects, my inventive structure includes a small, reversible, direct current motor joined operatively to the exposure control of a camera. A pair of switch contacts are correlated to the two directions of rotational movement of this motor. Additionally, a switch arm is interposed between these contacts and is linked to a moving coil or microammeter which is actuated by a conventional photoelectric cell or light meter. Thus, as the coil rotates the switch arm in response to the brightness of the scene being photographed, one of the switch contacts is made and the electric motor rotates the exposure control in a follow-up motion directly proportional to or related to said brightness. Should the brightness vary during a photographic sequence, the cell, switches meter, and motor all coact to vary the exposure setting accordingly. This provides what I choose to term a "continuous" aperture control. Furthermore, since no vibrators, amplifiers or rectifiers need be employed, the initial and the maintenance cost are kept to a minimum and a compact, portable device is produced.

A further object of my invention is to provide a rugged, compact unit for use with the conventional motion picture camera, said unit to include two separate portions of an automatic exposure control, one of which readily may be detachably secured to the objective mount of a camera and the other of which may be carried on the belt of a camera operator. Thus, the advantages of my invention are made to flow to the great mass of amateur photographers and the simplicity thereof allows the invention to be mounted upon a camera by one possessing a minimum of mechanical know how.

These and other objects and advantages of my invention will be set forth in the following detailed description, taken in conjunction with the accompanying drawings, wherein:

Fig. 1 is a side view, partially broken away, showing my automatic exposure control mounted detachably upon the objective mount of a portable motion picture camera;

Fig. 2 is an end view of the structure of Fig. 1 better indicating the multiple tube shield used in conjunction with the photoelectric cell to correlate the light falling upon the cell to the lens angle of the camera whereby each encompass the same scene;

Fig. 3 is a section view, taken substantially on the line 3—3 of Fig. 1, and showing an articulated linkage interconnecting an iris diaphragm type adjustable exposure control and a lever which is movable by a reversible, direct current electric motor, all in accord with my invention;

Fig. 4 is an enlarged detail view, taken substantially on the line 4—4 of Fig. 1, and showing the pair of switch contact means with a switch arm arranged therebetween selectively to actuate the aforementioned electric motor in one rotational direction;

Fig. 5 is an enlarged detail view, taken on the line 5—5 of Fig. 4, further indicating the relationship of the switch arm, which is actuated by a photoelectric cell, and the pair of switch contact means which control the rotation of the electric motor;

Fig. 6 is a schematic wiring diagram better indicating the operational relationship of the various elements of my invention; and Fig. 7 is a detail view showing the housing which is located distantly from the camera objective mount and is adapted to be carried, by a clip, upon the belt of the photographer.

As a preferred embodiment of my invention, I have shown a conventional objective mount 1 for a portable motion picture camera. This mount is equipped with the usual lens system and includes an adjustable exposure or light aperture control generally indicated at 2. As will be obvious from the following detailed description, my invention is equally useful with a still camera or with a television camera. However, I have chosen a movie camera for purposes of illustration because the problems solved by my inventive structure inherently are more acute in a movie camera than in a still camera. The word "camera," however, is meant to include any of the camera types herein mentioned. Furthermore, as will be obvious to those skilled in the camera art, my control can be utilized either to adjust a separate iris diaphragm type exposure control, such as that shown at 2, or it may be utilized with other exposure controls or as a limit means for controlling the maximum shutter opening in a camera having no separate exposure control.

Referring now to Fig. 1, I have therein shown a cylindrical housing 6 carried by two encircling bands 7 upon the objective mount 1. These bands 7 frictionally grip the peripheries of the cylindrical housing 6 and the objective mount 1 and detachably are held in place by a plurality of cap screws 8. Within the housing 6, a barrier-layer type photoelectric cell 9 is positioned directly behind a multiple tube shield 10. The photoelectric cell 9 may be a selenium, a copper oxide, or any other well-known type so long as a potential difference is generated when the cell is irradiated. Thus, the shield 10 directs the light from the scene to be photographed upon the photoelectric cell 9 to generate a potential difference directly or proportionally related to the brightness of the scene being photographed.

In accord with well-known practice, the potential difference generated by the photoelectric cell 9 causes a weak electric current to flow through a pivotally mounted coil 11 (see Fig. 4) interposed between the poles of a permanent magnet (not shown). The coil 11 includes an elongated pivot shaft 12 adapted to turn in a cup-shaped bearing provided in the end of an adjustment screw 13. Additionally, a coil spring 14 is secured at one end to the shaft 12 and at the other end to a tension arm 15. The tension arm 15 may be adjusted by rotating a nut 16 whereby the movements of the coil 11 are centered and calibrated. Furthermore, the shaft 12, spring 14, and arms 15 all are made of electrically conductive materials for a purpose hereinafter to be described.

To produce a strong electric motor output movement capable of adjusting the exposure control of a camera, I provide a reversible direct current motor 17. The rotor of this motor 17 is geared to a change speed mechanism mounted in a gear box 18 and having an elongated rotatable shaft 19 articulated therefrom. The motor 17 and the gear box 18 are mounted upon a triangular plate 20 secured to the housing 6 by means of three tubular bushings and bolts 21. Thus, the shaft 19 is axially aligned with the axis of rotation of the pivot shaft 12 and is mounted for rotation with respect to the housing 6.

Progressing forward along the shaft 19, two collars 22 and 23 are secured thereto as by set screws 24, and a bushing 25 is provided to journal the shaft for rotation. Integral with the left collar 22, I have provided an articulated linkage for actuating the aforementioned exposure control 2 in response to the rotation of the motor 17. This linkage, in my preferred embodiment, includes a laterally projecting arm 26 which articulates pivotally with a reach arm 27 (see Fig. 3). The reach arm 27, in turn, pivotally is connected to an actuation ear 28 selectively to adjust the leaves of an iris or other type diaphragm 29. Thus, as the shaft 19 is rotated by the motor 17, the iris diaphragm 29 is adjusted accordingly to admit more or less light to the camera.

Returning to the aforementioned right collar 23, a circular disk 30 is made integral therewith. This disk 30, adjacent the periphery thereof, carries a pair of switch contacts 31 and 32. Both of these contacts are insulated from the circular disk 30 by rubber cylinders 33. Additionally, the contact 31 is joined to a first electric lead line 41 and the contact 32 is joined to a second lead line 42. Thus, as the shaft 19 and disk 30 rotate with the motor 17, the two contacts 31 and 32 are caused to rotate with a magnified movement.

Interposed between the two contacts 31 and 32, I have shown a three-prong switch arm 34 which, preferably, is made of platinum to provide a reliable electrical conductivity with the contacts. The end of the switch arm 34 pierces the pivot shaft 12 for rotation therewith. Furthermore, by making the shaft 12, the spring 14, the tension arm 15, and the frame member 35 all electrically conductive, the switch 34 electrically is joined to an electric lead line 44. Such joinder is best accomplished by means of a bolt 36 secured to the frame 35 as shown in Fig. 4.

Those skilled in the camera art immediately will recognize that the disk 30 need not rotate with the shaft 19. Instead, this disk may be fixed and the shaft 19 may rotate the tension arm 15 to adjust the spring 14 and provide an optional type follow-up for the arm 34. Such changes, however, produce no more than an equivalent and the structure shown is my preferred embodiment.

In the schematic wiring diagram of Fig. 6, I have shown the various elements of my invention in their operative relationship. Thus, the lead lines 41 and 42 are shown joined to a pair of relays 37 and 38, respectively. The right relay 37 serves to open and close a spring biased actuation switch 39. Similarly, the left relay 38 controls a second actuation switch 40. Each of these switches, contacts, and relays are connected to a common source of direct current such as the small, pocket size battery 45. Furthermore, as is conventional, the two actuation switches 39 and 40 serve to control the direction of rotation of the reversible, direct current electric motor 17. That is to say, when the right relay 37 is actuated, the switch 39 is closed to rotate the motor 17 in a first direction. When the left relay 38 is actuated, the switch 40 is closed to reverse the rotation of the motor 17. Additionally, I have provided a pair of condensers 46 connected as shown and bridging the switch contacts 31 and 32 to suppress the spark generated when one of these switches is contacted by the switch arm 34 or when the contact therebetween is broken.

As best shown in Figs. 1 and 7, the electric conduits or lead lines which interconnect the relays 37 and 38 and the battery 45 with the remainder of the electric elements are joined together to define a cable 47. This cable leads to a housing member 43 having a clip 48 for carrying the housing on the belt of a cameraman. In this manner, my automatic exposure control is made portable for use in the field by the great majority of amateur camera fans. Furthermore, this housing and the detachable housing 6 make possible the sale of my inventive structure as a unit. Such a unit readily may be mounted upon any of a variety of cameras by the average camera fan. On the other hand, if my inventive structure is utilized in connection with a television camera, it may assume a more bulky form. Such form, however, will preserve the inventive concept of the claims.

In operation, the photoelectric cell 9 is directed toward the scene which is being photographed. Such direction is provided by the parallel mounting of the housing 6 upon the objective mount 2. In response to the current generated by the photoelectric cell 9, the coil 11 is rotated to carry with it the three-prong switch arm 34. Assuming that this rotation causes the switch arm 34 to move against the switch contact 32, a circuit will be completed via the lead line 42 through the relay 38. Actuation of the relay 38 moves the switch 40, against the force of its spring bias, to join the motor 17 with the source of current. Since I have correlated the rotational directions of the motor 17 to the movements of the coil 11, the motor will rotate the shaft 19 to cause the contacts 31 and 32 to follow the switch arm 34. Thereafter, rotation of the motor 17 and the shaft 19 will continue until the contact 32 moves away from the arm 34 or until a variance in the light level causes the arm 34 to reverse its direction of movement. In practice, this follow-up movement takes place in a very short interval of time. As previously explained, rotation of the shaft 19 carries with it the arm 26 which, in turn, adjusts the iris diaphragm 29 to admit more or less light to the camera. Accordingly, the opening and closing of the iris diaphragm or exposure control 29 varies in relation to and in proportion to the movements of the coil 11. The movements of the coil 11, in turn, vary in proportion to the brightness of the scene being photographed.

As will be made clear by an inspection of Fig. 6, my automatic exposure control mechanism is operative at all times whether the camera is taking pictures or not. Accordingly, the exposure control is adjusted continuously. Such continuous adjustment is of vital importance to my invention. Thus, should the light level change during a photographic sequence, as when the camera is following a moving object, my control will adjust the iris diaphragm immediately.

In accord with one of my inventive objects, this camera control structure is greatly simplified over those of the prior art. Such simplification allows the use of a small, pocket size battery to provide power for the small compact electric motor. Furthermore, because of the minimum number of operating parts and the rugged construction thereof, my control is portable, it requires a minimum initial investment, and it is easily repaired by the average camera fan.

I claim:

1. A portable automatic diaphragm control apparatus adaptable to cameras or the like, comprising a support, light responsive means mounted on said support for generating an electric current proportional in magnitude to the brightness of a scene, a clamp for said support for releasably mounting said support on a lens tube with said light responsive means directed at the field of the lens, a switch member on said support, means on said support actuated by the generated electric current for moving said switch member selectively in opposite directions, a pair of spaced contacts respectively on opposite sides of said switch member for selective engagement thereby, a reversible direct current motor on said support, a separate portable carrier, a source of direct electric current on said carrier, a cable connecting said support and carrier and including a power circuit through said source and said motor, a pair of switch devices on said carrier for respectively closing said power circuit to regulate the direction of rotation of said motor, a control circuit through said cable and including a connection between said switch member and said source and a connection between each of said contacts and said source, a relay on said carrier respectively controlling one of said switch devices to close said power circuit to drive said motor in accordance with the contact engaged by said switch member, a shaft on said support and driven by said motor, means on said shaft for connection with a diaphragm control, and a second means on said shaft and connected directly with said pair of contacts to establish equilibrium between said contacts and switch member after actuation of said switch member.

2. An apparatus as defined in claim 1 wherein said means for connection with a diaphragm control comprises a crank member on said shaft and a link connected with said crank member and adapted to be connected with the diaphragm control.

NEVILLE E. WALKER.

References Cited in the file of this patent

UNITED STATES PATENTS

| Number | Name | Date |
|---|---|---|
| 1,018,635 | Shukis | Feb. 27, 1912 |
| 1,313,872 | Andrushes | Aug. 26, 1919 |
| 2,388,609 | Ericsson | Nov. 6, 1945 |
| 2,412,424 | Rath | Dec. 10, 1946 |
| 2,421,476 | Belar et al. | June 3, 1947 |
| 2,421,499 | Guedon | June 3, 1947 |
| 2,453,693 | Armstrong et al. | Nov. 16, 1948 |

FOREIGN PATENTS

| Number | Country | Date |
|---|---|---|
| 763,279 | France | Feb. 12, 1934 |
| 649,259 | Germany | Aug. 19, 1937 |
| 491,410 | Great Britain | Sept. 1, 1948 |
| 257,428 | Switzerland | Apr. 1, 1949 |